US010527230B2

United States Patent
Stachulla et al.

(10) Patent No.: US 10,527,230 B2
(45) Date of Patent: Jan. 7, 2020

(54) CONTAINER FOR RECEIVING AND STORING CRYOGENIC FLUIDS PARTICULARLY CRYOGENIC LIQUIDS AND VISCOUS MATERIALS, AND METHOD FOR THE PRODUCTION THEREOF, AND USE THEREOF

(71) Applicant: MT AEROSPACE AG, Augsburg (DE)

(72) Inventors: Martin Stachulla, Wehringen (DE); Daniel Zell, Kühlenthal (DE)

(73) Assignee: MT Aerospace AG, Augsburg (DE)

( * ) Notice: Subject to any disclaimer, the term of this patent is extended or adjusted under 35 U.S.C. 154(b) by 0 days.

(21) Appl. No.: 15/509,737

(22) PCT Filed: Aug. 26, 2015

(86) PCT No.: PCT/EP2015/069529
§ 371 (c)(1),
(2) Date: Mar. 8, 2017

(87) PCT Pub. No.: WO2016/037852
PCT Pub. Date: Mar. 17, 2016

(65) Prior Publication Data
US 2017/0299120 A1      Oct. 19, 2017

(30) Foreign Application Priority Data

Sep. 9, 2014 (DE) .......................... 10 2014 112 935
Mar. 4, 2015 (DE) .......................... 10 2015 002 708

(51) Int. Cl.
*B21D 22/16* (2006.01)
*F17C 3/00* (2006.01)
(Continued)

(52) U.S. Cl.
CPC ................ *F17C 3/00* (2013.01); *B21D 22/16* (2013.01); *B21D 51/16* (2013.01); *B21D 51/18* (2013.01);
(Continued)

(58) Field of Classification Search
CPC ........ B21D 22/14; B21D 22/16; B21D 22/18; B21D 22/185; B21D 51/04; B21D 51/18;
(Continued)

(56) References Cited

U.S. PATENT DOCUMENTS 2,139,682 A * 12/1938 Hothersall ......... B21D 51/2646
29/DIG. 33
2,379,584 A * 7/1945 Litton .................... B23D 21/00
264/163
(Continued)

FOREIGN PATENT DOCUMENTS

EP          2 447 544 A2    5/2012
GB          2153278 A *    8/1985 ............. B21D 22/16
(Continued)

OTHER PUBLICATIONS

Translation, WO 98/43013 A1, Oct. 1998.*
International Search Report cited in PCT/EP2015/069529, dated Feb. 1, 2016, 3 pages.

*Primary Examiner* — Edward T Tolan
(74) *Attorney, Agent, or Firm* — Rothwell, Figg, Ernst & Manbeck, P.C.

(57) ABSTRACT

The invention relates to a container for holding and storing liquids and viscous materials, in particular cryogenic fluids, comprising a jacket (12), which defines the interior (14) of the container (10) having a chamber (16), said container (10) being constituted of at least two container structures (20, 20', 20") and each of said at least two container structures (20, 20', 20") being formed as one piece from a blank (32) and having a dome portion (22), a branching portion (24), which is contiguous to the dome portion (22), and two cylinder portions (26, 28; 26', 28'), which are contiguous to the branching portion (24), and the mutually facing container structures (20, 20; 20', 20") which are adjacent to each other being joined together.

12 Claims, 11 Drawing Sheets

Figure 1:
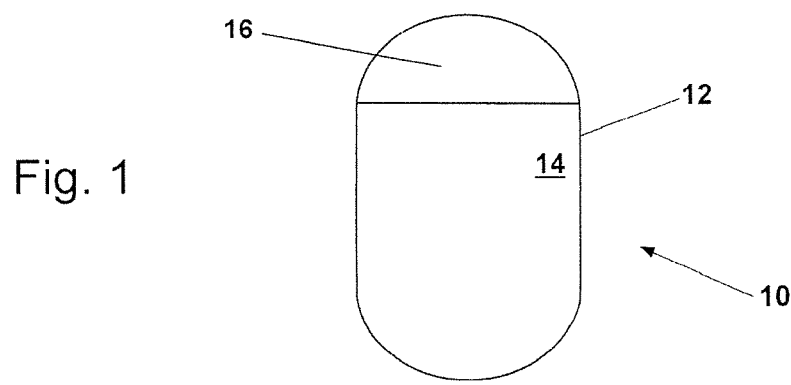

(51) Int. Cl.
*B21D 51/18* (2006.01)
*B21D 51/16* (2006.01)
*B23K 20/12* (2006.01)
*B23K 101/04* (2006.01)

(52) U.S. Cl.
CPC .......... *B23K 20/122* (2013.01); *B23K 20/129* (2013.01); *B23K 2101/04* (2018.08); *F17C 2201/0104* (2013.01); *F17C 2201/0109* (2013.01); *F17C 2201/0114* (2013.01); *F17C 2201/0119* (2013.01); *F17C 2201/0166* (2013.01); *F17C 2201/032* (2013.01); *F17C 2201/054* (2013.01); *F17C 2201/056* (2013.01); *F17C 2203/012* (2013.01); *F17C 2203/013* (2013.01); *F17C 2203/0617* (2013.01); *F17C 2203/0639* (2013.01); *F17C 2203/0643* (2013.01); *F17C 2203/0646* (2013.01); *F17C 2203/0648* (2013.01); *F17C 2209/2181* (2013.01); *F17C 2209/221* (2013.01); *F17C 2209/222* (2013.01); *F17C 2209/224* (2013.01); *F17C 2209/232* (2013.01); *F17C 2209/234* (2013.01); *F17C 2209/236* (2013.01); *F17C 2221/011* (2013.01); *F17C 2221/012* (2013.01); *F17C 2221/032* (2013.01); *F17C 2221/08* (2013.01); *F17C 2223/0161* (2013.01); *F17C 2223/031* (2013.01); *F17C 2223/033* (2013.01); *F17C 2223/035* (2013.01); *F17C 2223/038* (2013.01); *F17C 2260/011* (2013.01); *F17C 2260/012* (2013.01); *F17C 2260/013* (2013.01); *F17C 2270/0105* (2013.01); *F17C 2270/0131* (2013.01); *F17C 2270/0168* (2013.01); *F17C 2270/0171* (2013.01); *F17C 2270/0178* (2013.01); *F17C 2270/0189* (2013.01); *F17C 2270/0194* (2013.01); *F17C 2270/0197* (2013.01); *Y02E 60/321* (2013.01)

(58) Field of Classification Search
CPC . B21D 51/24; B21D 51/16; F17C 3/00; F17C 2201/0166; F17C 2203/012; F17C 2203/013; B23K 20/129
See application file for complete search history.

(56) References Cited

U.S. PATENT DOCUMENTS

| | | | | |
|---|---|---|---|---|
| 3,160,036 | A * | 12/1964 | Ernestus | B21C 37/205 72/85 |
| 3,460,233 | A * | 8/1969 | Van Horik | B21D 22/16 228/181 |
| 3,893,818 | A * | 7/1975 | Mickus | B21H 1/04 29/892.2 |
| 4,129,025 | A * | 12/1978 | Carey | B21D 22/14 138/30 |
| 5,018,634 | A | 5/1991 | Le Touche | |
| 5,236,115 | A * | 8/1993 | Pape | B21H 1/04 228/170 |
| 5,718,140 | A * | 2/1998 | Koestermeier | B21D 22/14 72/71 |
| 5,829,291 | A * | 11/1998 | Tanaka | B21H 1/04 72/71 |
| 6,647,839 | B2 * | 11/2003 | Yoshitome | B21D 22/14 72/71 |
| 9,233,412 | B2 * | 1/2016 | Huetter | B21D 22/185 |
| 2003/0076002 | A1 * | 4/2003 | Pritchard | B21D 22/16 310/265 |
| 2010/0011830 | A1 * | 1/2010 | Huetter | B21D 22/16 72/206 |
| 2012/0018587 | A1 | 1/2012 | Robinson | |
| 2012/0193244 | A1 | 8/2012 | Cola | |

FOREIGN PATENT DOCUMENTS

| | | | |
|---|---|---|---|
| GB | 2 264 684 A | 9/1993 | |
| WO | 98/43013 A1 * | 10/1998 | F17C 1/16 |

* cited by examiner

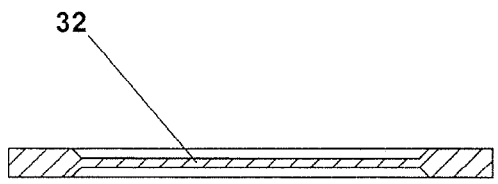
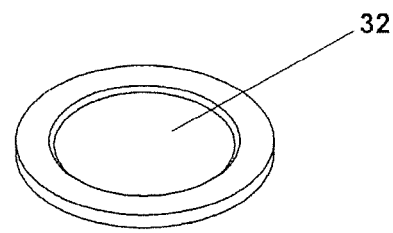
Fig. 5A Fig. 5B
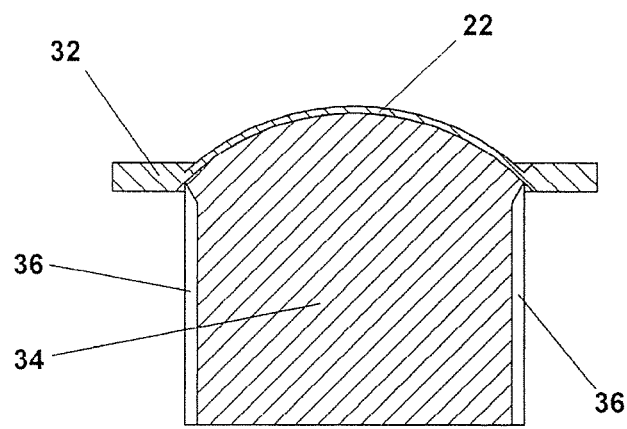
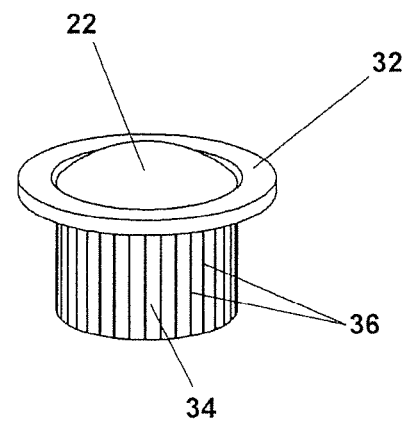
Fig. 5C Fig. 5D
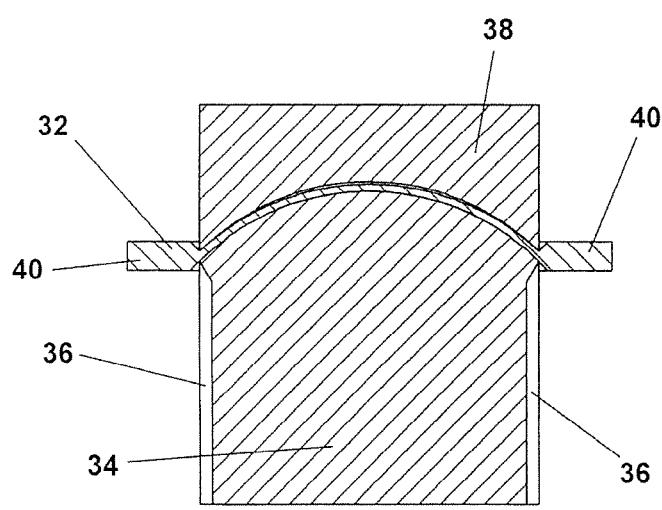
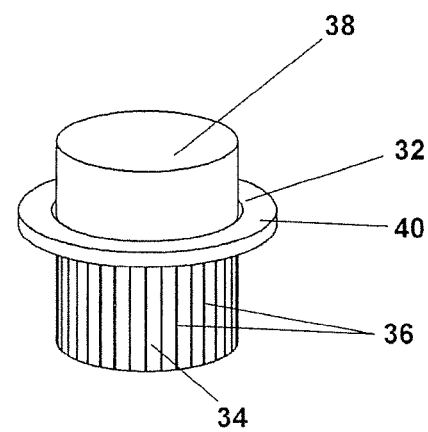
Fig. 5E Fig. 5F

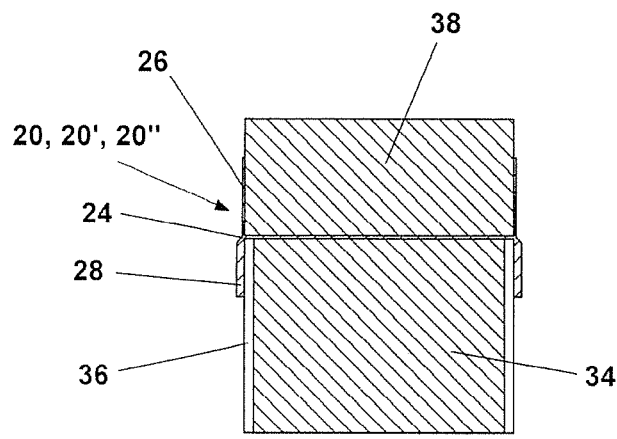
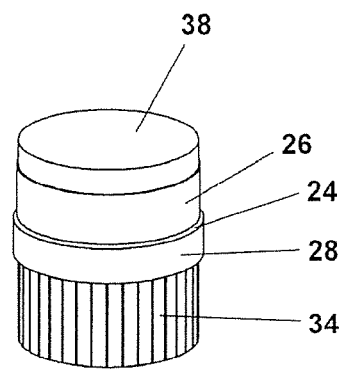
Fig. 6G Fig. 6H
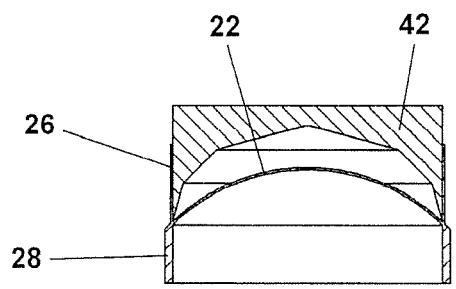
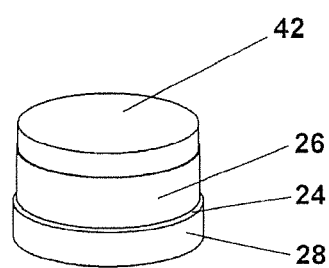
Fig. 6I Fig. 6J
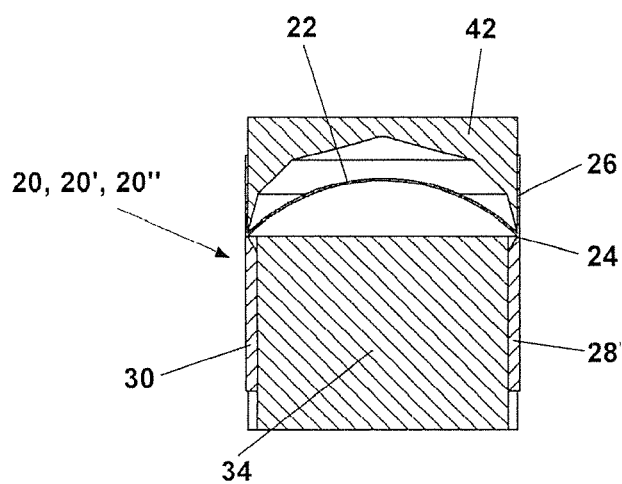
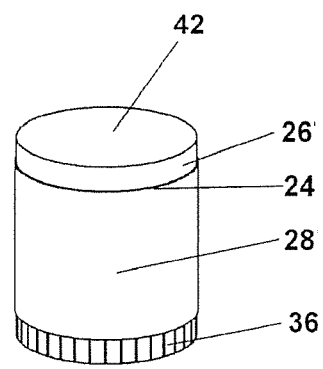
Fig. 6K Fig. 6L

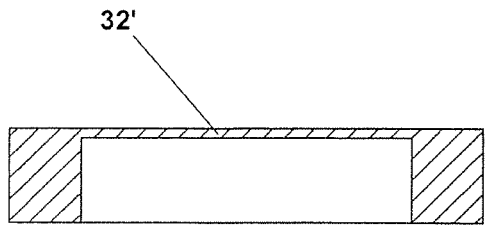
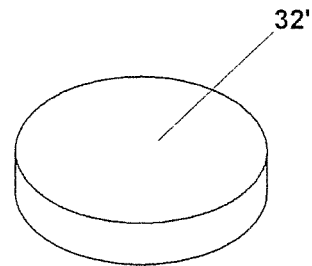
Fig. 7A Fig. 7B
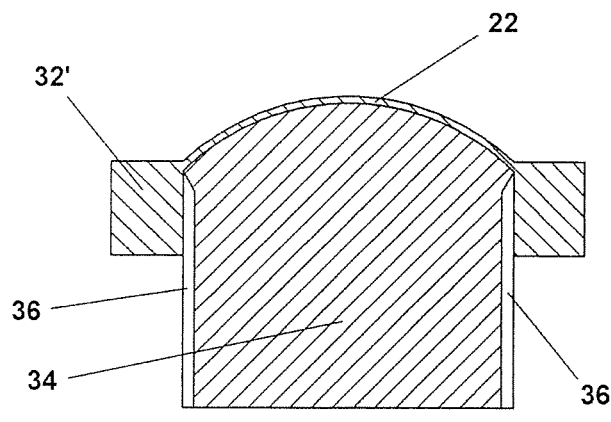
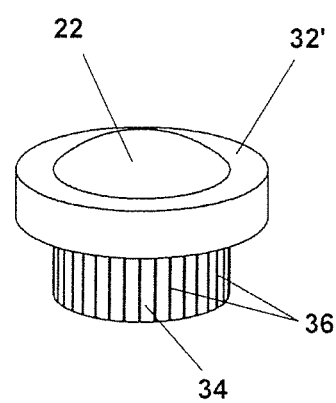
Fig. 7C Fig. 7D
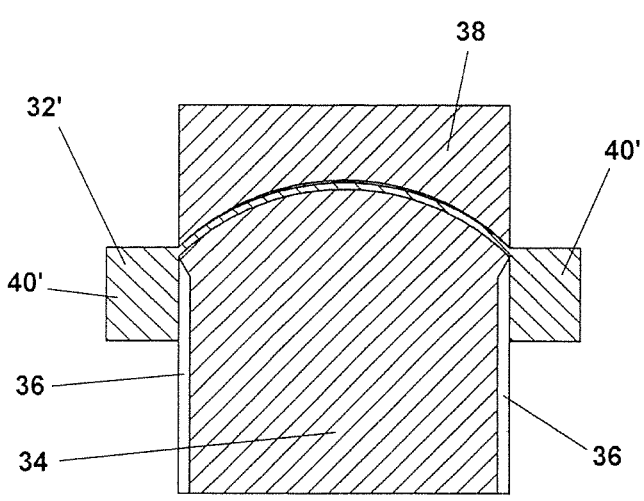
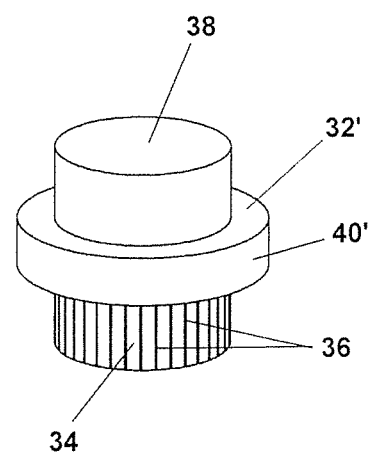
Fig. 7E Fig. 7F

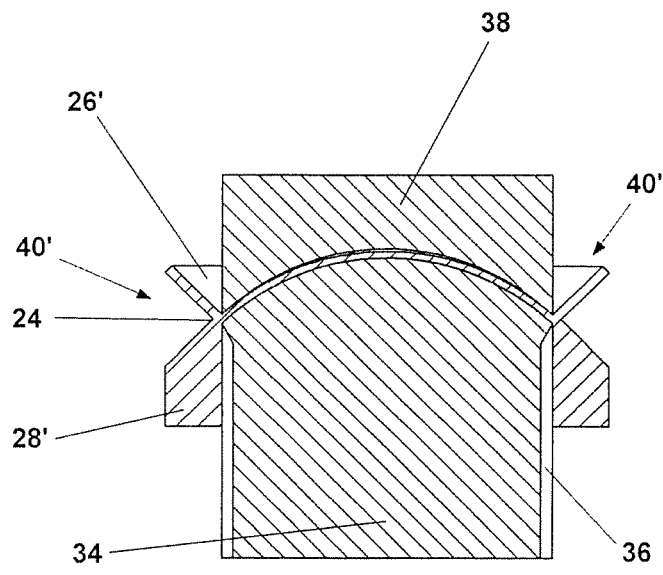
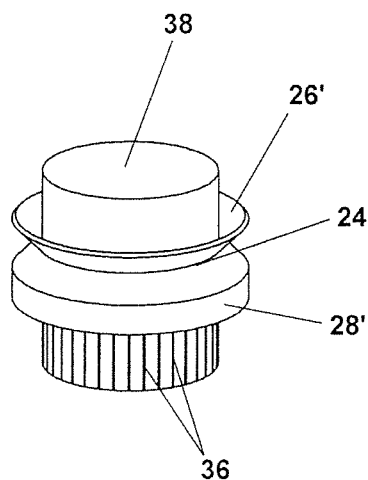
Fig. 7G                Fig. 7H
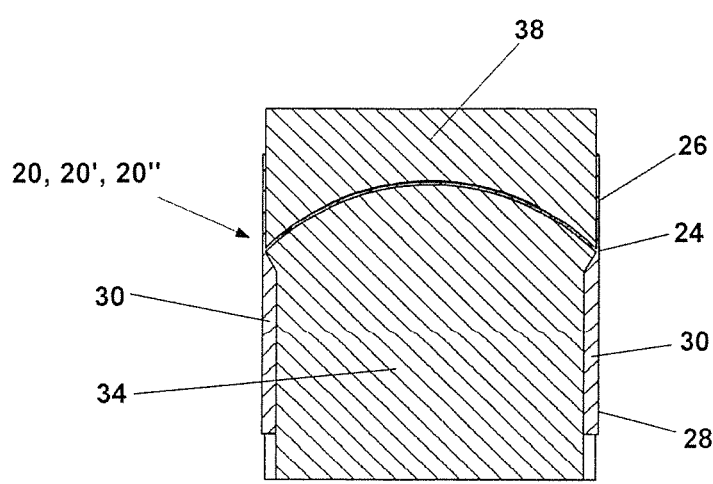
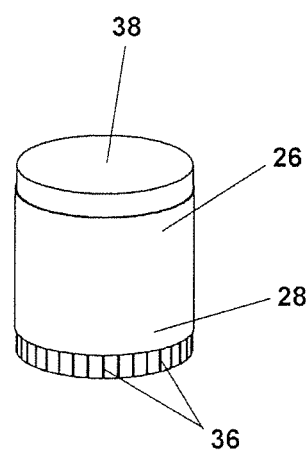
Fig. 7I                Fig. 7J

Figure 8G:
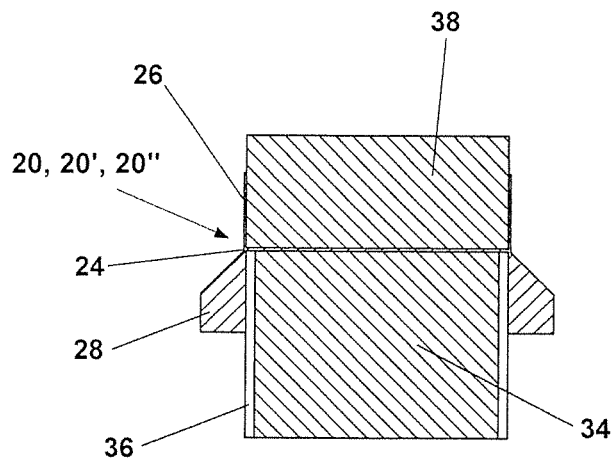
Figure 8H:
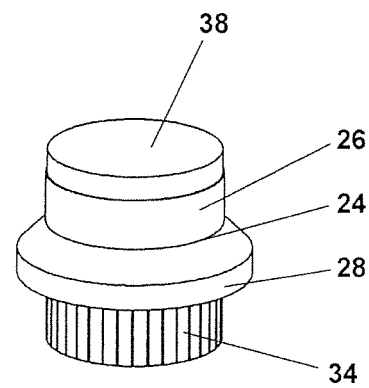
Figure 8I:
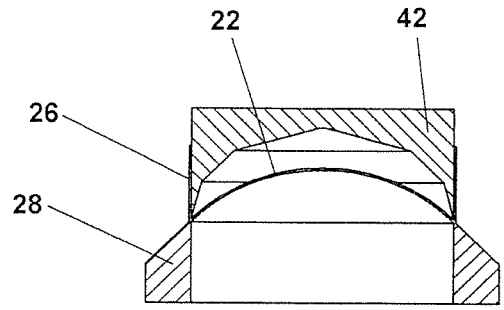
Figure 8J:
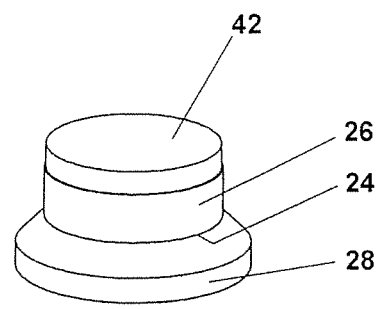
Figure 8K:
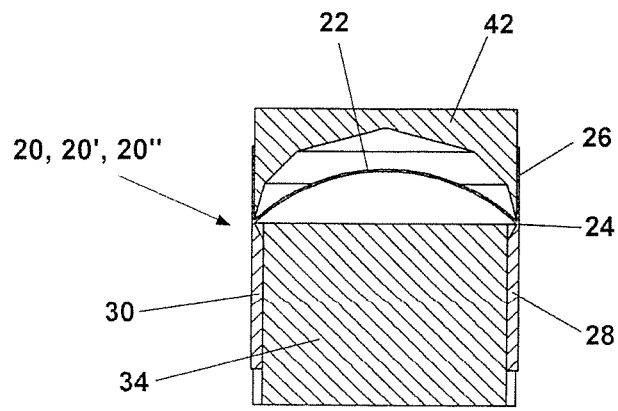
Figure 8L:
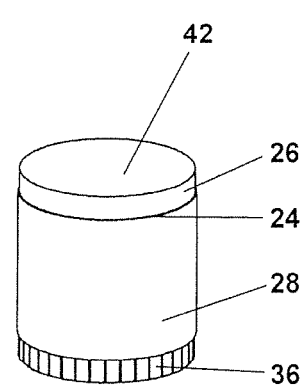

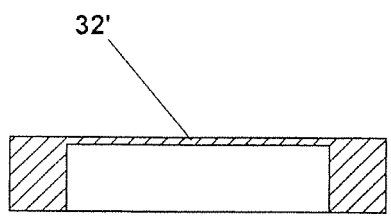
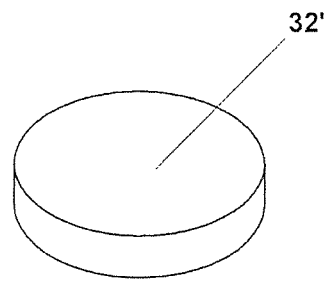
Fig. 8A Fig. 8B
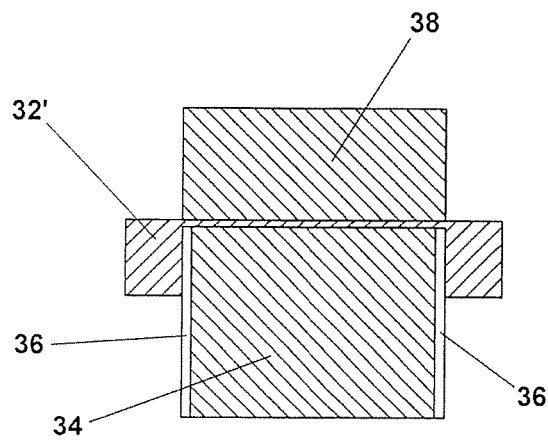
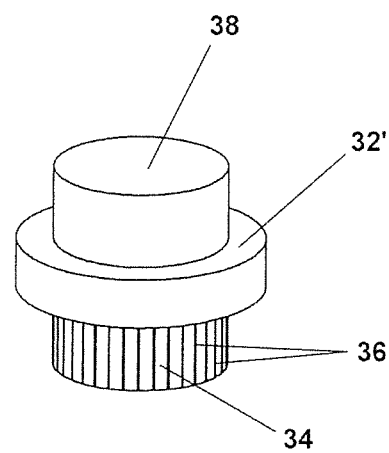
Fig. 8C Fig. 8D
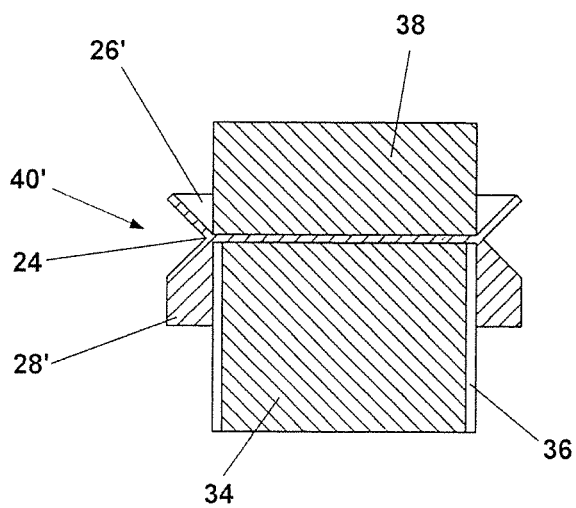
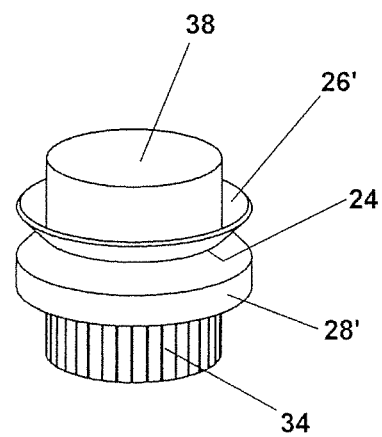
Fig. 8E Fig. 8F (state of the art)

CONTAINER FOR RECEIVING AND
STORING CRYOGENIC FLUIDS
PARTICULARLY CRYOGENIC LIQUIDS
AND VISCOUS MATERIALS, AND METHOD
FOR THE PRODUCTION THEREOF, AND
USE THEREOF

CROSS REFERENCE TO RELATED
APPLICATION

This application is a 35 U.S.C. 371 National Phase Entry Application from PCT/EP2015/069529, filed Aug. 26, 2015, which claims the benefit of German Patent Application Nos. 10 2014 112 935.0 filed on Sep. 9, 2014 and 10 2015 002 708.5 filed on Mar. 4, 2015, the disclosures of which are incorporated herein in their entirety by reference.

This invention relates to a container for receiving and storing cryogenic fluids, particularly cryogenic liquids and viscous materials, and method for the production thereof, and use thereof.

Containers of this kind are generally known. In general, such containers, as for example described in U.S. Pat. No. 5,018,634 A and/or shown in FIG. 9, consist of domes 44, 44', 44" and cylindrical components 46, 46' that are welded together by means of so-called Y-rings or Y-shaped ring elements 48, 48', 48". Here, planar plates are milled with a thickness contour and cut into individual segments. Those segments are shaped through shot peen forming processes, for example. Subsequently, these shaped segments must be joined into complete domes by welding, while the welding areas come out very thick in comparison due to very poor material properties as a result of welding. The cylindrical components are produced from planar plates which initially are bent to the required radius, then are machined and equipped with reinforcement ribs on their inside. Finally, the thus produced "Face Sheets" are joined with longitudinal welding seams to form cylindrical components. The Y-rings are usually either rolled from an ingot into large rings and subsequently finished by means of extensive machine turning/milling (as in the Ariane 5, for example), or welded together from several curved extruded profiles and subsequently machined (as in the NASA Space Launch System, for example). Although such containers and their production methods have proven to be effective in the past, they have substantial disadvantages due to the multitude of individual components. On the one hand, such a multitude of individual components and, on the other hand, the use of such a variety of joining methods, which are sometimes fundamentally different, require additional substantial measures for improving the process safety to meet the high quality requirements for aerospace applications. On the other hand, such a multitude of individual components leads to an extremely labour-intensive, therefore personnel and time-intensive production, which overall results in a particularly costly production.

The object of the present invention is therefore to provide a container for receiving and storing liquids and viscous materials, in particular cryogenic fluids, by means of which the aforementioned disadvantages can be prevented, is therefore structurally particularly simple, at the same time compact and stable, as a result has a high strength and stiffness and is very cost-effective to produce, and to provide a method for its production and its use.

With regard to the technical device, this object is achieved in a surprisingly simple manner by the features of some embodiments.

By means of the embodiment of the container according to the invention for receiving and storing liquids and viscous materials, in particular cryogenic fluids, comprising a jacket, which defines the interior of the container having chamber, said container being constituted of at least two container structures and each of said at least two container structures being formed as one piece from a blank and having a dome portion, a branching portion, which is contiguous to the dome portion, and two cylinder portions, which are contiguous to the branching portion, and the mutually facing container structures which are adjacent to each other being joined together, or alternatively, with a casing and at least one bulkhead, which separates the interior space of the container into at least two chambers adjacent to each other, characterized in that the container is formed of at least three container structures, wherein the at least three container structures are each deformed from a blank as a single part and have a dome section, a branch section attaching to the dome section and two cylinder sections attaching to the branch section, and wherein the adjacent facing container structures are joined together, a particularly simple yet compact and stable construction of the container is achieved that also has a relatively low weight. The container according to the invention only consists of very few individual components that can also be easily standardized at will and at any time and joined by a few shaping steps. This is also one of the reasons why the container according to the invention has a particularly high strength and stiffness. Finally, the production of the container according to the invention is extremely simple requiring little work and time input and thus is particularly cost-effective.

Advantageous structural details of the container in accordance with the invention are described in some embodiments.

To simplify and improve the adaptability of the shape of the container shape to the individual design situations and specifications while at the same time fundamentally enhancing the possibilities for variation, the measures according to an embodiment, specifying that the blank is flat, planar or of similar shape, preferably essentially circular or disk-shaped, or cylindrical, in particular in form of a cylinder, are of particular importance. Most preferred is a short cylinder.

Also of great importance for a highly simple and thus cost-effective design and high functional reliability in mechanical terms, on the one hand, as well as a particularly versatile and individual adaptability to design situations and specifications, on the other hand, are the characteristics of an embodiment. According to this embodiment, the container structures adjacent to each other are joined together directly and/or indirectly via at least one other cylinder element.

Of equally great importance to facilitate a highly simple, compact and functional design with an associated significant cost reduction or saving are the constructive measures of an embodiment. According to this embodiment, the container structure(s) adjacent to each other and/or the at least one other cylinder element are flow turned and/or spun or welded together.

In an advantageous manner, the container, in particular the container structure(s) and/or the at least one further cylinder element of the container, according to the measures of an embodiment is/are designed in a lightweight way.

Furthermore, in accordance with the invention, it is provided that the container, in particular the container structure(s) and/or the at least one further cylinder element of the container, according to an embodiment is/are made of metal, in particular of steel, stainless steel, aluminum, titanium, an alloy of the above and/or a combination of the above.

Moreover, it has been shown to be appropriate that the dome portion of the container structure(s) according to an embodiment is/are formed hemispherical, spherical-flat shaped, dome-shaped, ellipsoidal-dome shaped, conical, elliptical, Cassini-shaped or with other cross-section shapes.

Also of great importance for increased strength and stiffness are the characteristics of an embodiment, according to which the cylinder section(s) of the container structure(s) and/or the at least one other cylinder element of the container are reinforced. Suitable for this are reinforcements, alternatively or additionally, preferably in the form of (stiffening) ribs, ribs, reinforcing ribs, stringers and/or isogrid or orthogrid structures arranged on the outside and/or inside, most preferably on the inside. This design allows for significant weight savings without compromising the strength and stiffness of the container, meeting the aerospace industry's requirements regarding lightweight design criteria in a particularly efficient manner.

This object is achieved, with regard to a method, in a surprisingly simple manner by the features of some embodiments.

Through the embodiment of the methods according to the invention for producing a container for receiving and storing cryogenic fluids, in particular cryogenic liquids and viscous materials, with a casing forming the interior space of the container with at least one chamber, or with a casing and at least one bulkhead, which separates the container's interior space into at least two adjacent chambers, comprising the following steps:
 a) Providing a blank,
 b) clamping the blank onto or into at least one support structure or spin chuck,
 c) deforming the blank by means of spin forming into a dome section of a container structure,
 d) deforming an edge of the blank into a branch section attaching to the dome section and two essentially radially extending cylinder sections of the container structure that are attaching to the branch section through splitting by means of a splitting roller acting on the edge of the blank,
 e) flow turning or flow pressing and/or spinning of the two essentially radially extending cylinder sections of the container structure that are attaching to the branch section into two axially extending cylinder sections of the container structure,
 f) forming at least one or two additional container structure(s) according to steps a) to e),
 g) joining the adjacent facing container structures into a container,
or alternatively comprising the following steps:
 a) Providing a blank,
 b) clamping the blank onto or into at least one support structure or spin chuck,
 c) deforming an edge of the blank into a branch section and two essentially radially extending cylinder sections of the container structure that are attaching to the branch section through splitting by means of a splitting roller acting on the edge of the blank,
 d) deforming the blank by means of spin forming into a dome section of the container structure that is attaching to the branch section,
 e) flow turning or flow pressing and/or spinning of the two essentially radially extending cylinder sections of the container structure that are attaching to the branch section into two axially extending cylinder sections of the container structure according to step c) or d),
 f) forming at least one or two additional container structure(s) according to steps a) to e),
 g) joining the adjacent facing container structures into a container, the invention proposes methods which prove to be particularly beneficial, in addition to the benefits described in connection with the container according to the invention. As a result, the methods according to the invention allow for the production of a container with a particularly simple, compact and stable design and low weight. Furthermore, in a highly beneficial way, the methods according to the invention provide a container that only consists of very few individual components that can also easily be standardised at will and at any time. In this connection, it is also possible to produce various cross-sectional geometries in the container structure(s) that can be used as structural reinforcement at the same time. Additionally, as a particular benefit, the methods according to the invention distinguish themselves by the fact that, on the one hand, the container can be joined by means of fewer forming steps, and, on the other hand, welding or any other joining measures that may result in warping and weakening of the material (welding quality factor) are avoided. This is also one of the reasons why the container produced by the methods according to the invention has a particularly high strength and stiffness. Finally, the production of the container according to the invention by applying the methods according to the invention is particularly simple requiring little work and time input and thus is particularly cost-effective.

Further advantageous details of the method in accordance with the invention are described in some embodiments.

For instance, a preferred embodiment of the invention according to an embodiment provides that the blank to be provided in step a) is flat, planar or of similar shape, preferably essentially circular or disk-shaped, or cylindrical, in particular in form of a, preferably short, cylinder.

Preferably, the blank according to an embodiment is machined by cutting, in particular by mechanical cutting, laser or water jet cutting, sawing, milling or eroding.

Furthermore, the characteristics of an embodiment are of particular interest for maintaining a desired final wall thickness of the dome section of the container structure. Accordingly, the blank, preferably before clamping and in particular before deforming, is (pre-) contoured and/or pre-contoured or contoured by machining, in particular by turning, milling and/or grinding, so it acquires a pre-defined wall thickness distribution in flat state. By (pre-)contouring and/or pre-contouring or contouring the initial thickness prior to deforming, the final wall thickness of the container structure can be fine-tuned.

Furthermore, it is within the framework of the invention that the blank and/or the container structure according to an embodiment is clamped onto or into the at least one support structure or spin chuck and another support structure or spin chuck acting in conjunction with it.

Of further major importance for an economic, extremely high dimensional accuracy of the produced shell body and a further increased strength are the characteristics of an embodiment. According to this embodiment, the dome section of the container structure is shaped into the shell body by convex or concave spin forming or turning, preferably deformed by concave spin forming and/or turning.

It is also provided by the invention that the branch section and the two cylinder sections of the container structure according to an embodiment are shaped by splitting by means of a splitting roller acting on the edge of the blank, the splitting roller having an essentially cone-shaped, diamond-shaped or sharp-edged cross-section.

In this connection, according to an embodiment, the two cylinder sections of the container structure that are attaching to the branch section are flow turned and/or spun preferably after the splitting by means of the splitting roller acting on the edge of the blank from the essentially radial extension into two axially extending cylinder sections of the container structure, in particular above and below the dome section and the branch section attaching to the dome section.

Preferably, the container structures adjacent to each other are joined together directly according to an embodiment. Alternatively or additionally, it is also easily possible to join the container structures adjacent to each other indirectly via at least one other cylinder element. This allows to design the shape and geometry of the container or any other design features individually, at will and in a versatile way.

Furthermore, in an advantageous manner, it is also provided according to an embodiment that the cylinder section(s) of the container structure(s) and/or the at least one other cylinder element of the container are reinforced, in particular by reinforcements on the inside, alternatively or additionally, preferably in the form of (stiffening) ribs, ribs, reinforcing ribs, stringers and/or isogrid or orthogrid structures arranged on the outside and/or inside, most preferably on the inside.

Furthermore, of great interest for a highly simple, compact and functional design with an associated significant cost reduction or saving are also the measures of an embodiment, stating that the container structures adjacent to each other and/or the at least one other cylinder element are flow turned and/or spun or welded together, in particular by means of friction stir welding (FSW).

Finally, according to claim an embodiment, it is within the framework of the invention to use the container according to the invention for receiving and storing liquids and viscous materials, particularly cryogenic fluids, preferably oxygen and hydrogen, in vehicles, particularly in aerodynes or aircraft for application in aeronautics, preferably in aeroplanes and space aerodynes, particularly in water vehicles, preferably in a submarine or air cushion craft (Hovercraft), or particularly in land vehicles, preferably in a passenger vehicle, truck or caravan, particularly for receiving and storing of liquids and viscous materials, particularly of cryogenic fluids, for rocket propellant tanks and satellite tanks.

In a quite advantegeous manner, the container in accordance with the invention is/are suitable for receiving and storing liquids and viscous materials, particularly cryogenic fluids, and for gaseous, liquid and solid media, preferably fuels or propellants, such as hydrazine, monomethylhydrazine (MMH), unsymmetrical dimethlyhydrazine (UDMH) or kerosine, oxidizing agents (oxidizers), such as nitrogen tetroxides or dinitrogen tetroxides (NTO), or fuel/oxidizer mixes and/or (drinking) water and waste water, for tanks and fuel tanks of rockets and/or satellites.

Further features, advantages and details of the invention are contained in the following description of preferred embodiments of the invention, and in connection with the drawings.

Figure 2A:
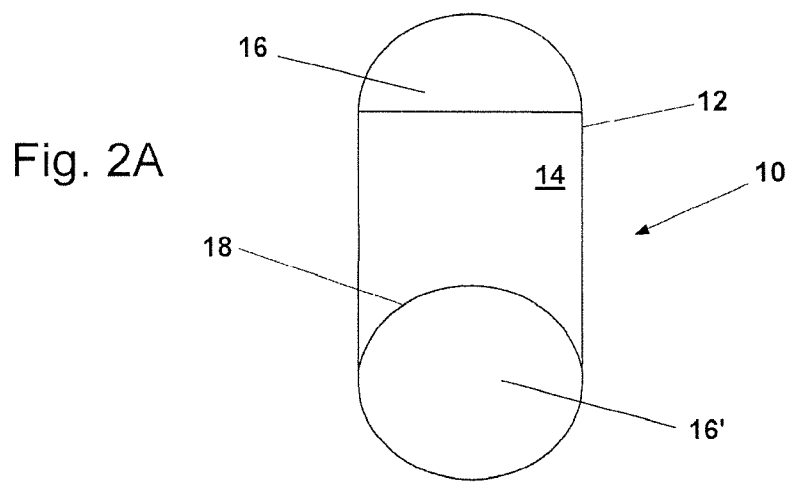
Figure 2B:
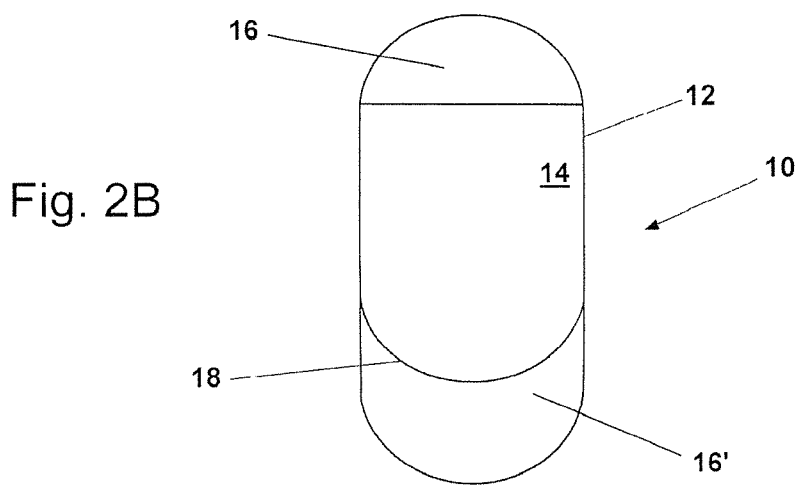
Figure 3:
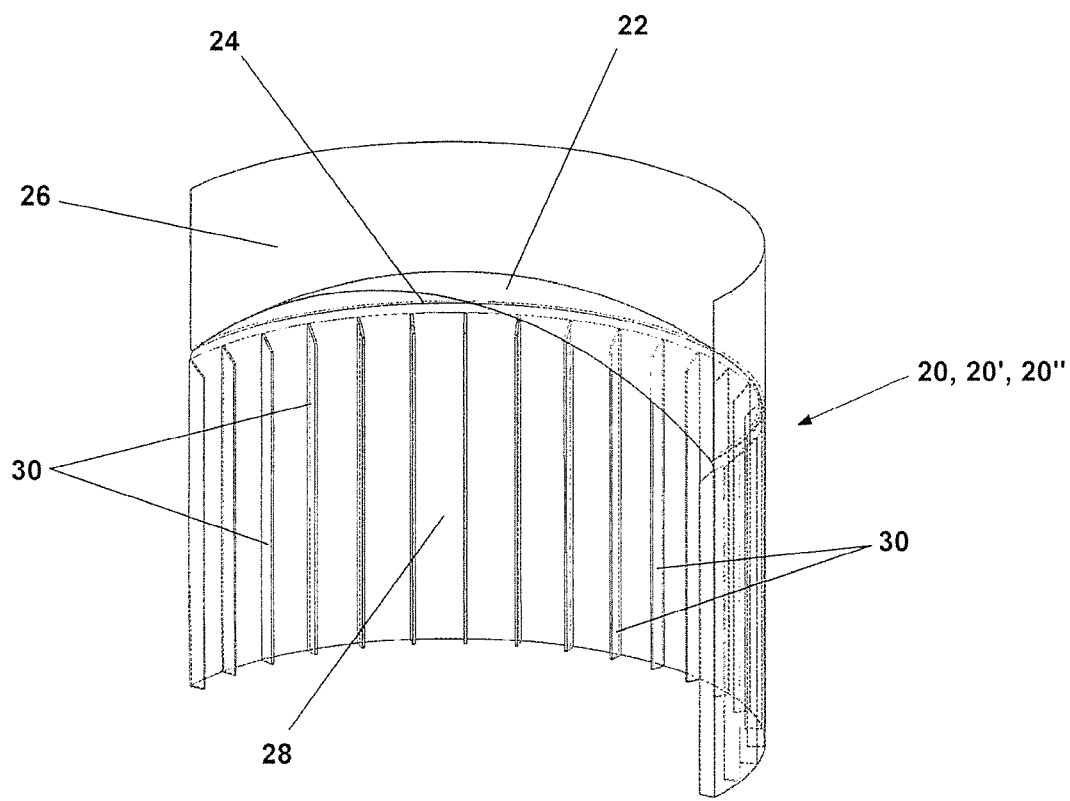
Figure 4:
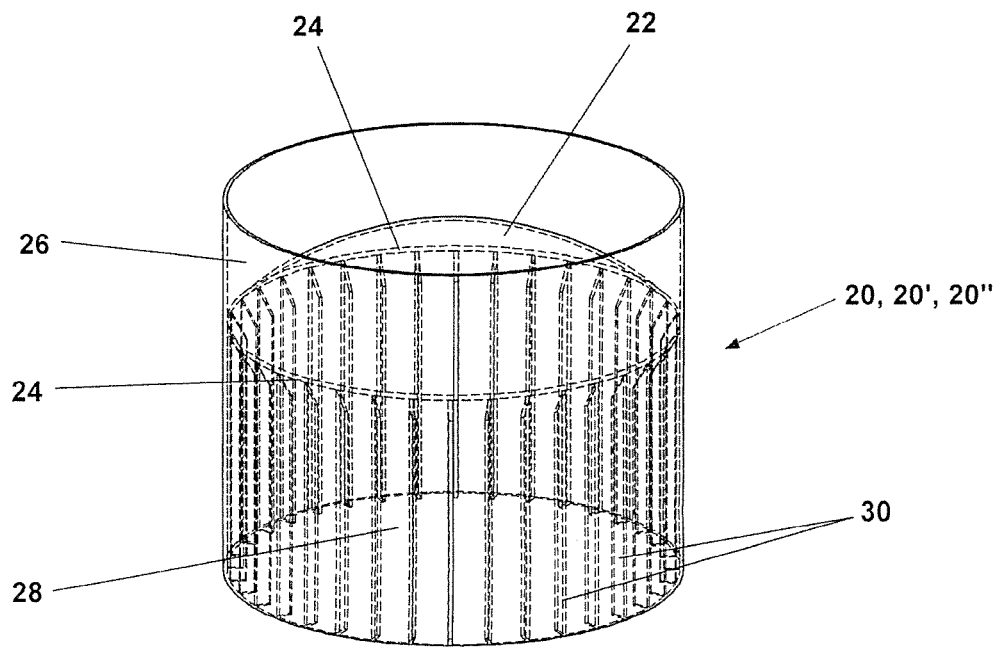

The drawings are as follows:

FIG. 1 a schematic lengthwise sectional view through an embodiment of a container designed according to the invention, FIGS. 2A and 2B schematic lengthwise sectional views through other embodiments of containers designed according to the invention, FIG. 3 a partially opened, perspective view of an embodiment of a container structure designed according to the invention, on an enlarged scale, FIG. 4 a schematic, perspective sectional view of the embodiment of the container structure designed according to the invention in accordance with FIG. 3, on a reduced scale, FIGS. 5A to 5J various sectional views and associated perspective views of a blank and of a container structure to provide a schematic representation of a method according to the invention to produce a container structure designed according to the invention, FIGS. 6A to 6L various sectional views and associated perspective views of a blank and of a container structure to provide a schematic representation of another method according to the invention to produce a container structure designed according to the invention, FIGS. 7A to 7J various sectional views and associated perspective views of a cylindrical blank and of a container structure to provide a schematic representation of a further method according to the invention to produce a container structure designed according to the invention in accordance with FIG. 5A to 5J, FIGS. 8A to 8L various sectional views and associated perspective views of a cylindrical blank and of a container structure to provide a schematic representation of yet another method according to the invention to produce a container structure designed according to the invention in accordance with FIG. 6A to 6L, and FIG. 9 a partially opened, exploded lengthwise sectional view through a container known in the art.

In the following description of various embodiments of the container 10 in accordance with the invention for receiving and storing liquids and viscous materials, particularly cryogenic fluids, and of methods for the production thereof, similar components that correspond to each other are each provided with identical reference numbers.

The container 10 for receiving and storing liquids and viscous materials, particularly cryogenic fluids, preferably oxygen and hydrogen, is used in an advantageous manner in vehicles, particularly in aerodynes or aircraft for application in aeronautics, preferably in aeroplanes and space aerodynes, particularly in water vehicles, preferably in a submarine or air cushion craft (Hovercraft), or particularly in land vehicles, preferably in a passenger vehicle, truck or caravan, particularly for receiving and storing of liquids and viscous materials, particularly of cryogenic fluids, for rocket propellant tanks and satellite tanks. The container 10 in accordance with the invention is particularly suited for rocket propellant tanks and satellite tanks, to receive and store liquids and viscous materials, particularly of cryogenic fluids, and gaseous, liquid and solid materials, preferably fuels or propellants, such as hydrazine, monomethylhydrazine (MMH), unsymmenrical dimethlyhydrazine (UDMH) or kerosine, oxidizing agents (oxidizers), such as nitrogen tetroxides or dinitrogen tetroxides (NTO), or fuel/oxidizer mixes and/or (drinking) water and waste water, for tanks and fuel tanks of rockets and/or satellites.

The container 10 according to the invention shown in schematic view in FIG. 1 comprises a, in particular thin-walled, casing 12, which forms the interior space 14 of the container 10 with at least one chamber 16. In the chamber 16 are received and stored, for example, cryogenic fluids such as oxygen (LOX) and hydrogen (LH2) that are used as fuel/oxidator mixture in an upper stage of a carrier rocket (not shown).

The containers 10 according to the invention schematically shown in FIGS. 2A and 2B comprise a, in particular thin-walled, casing 12 and at least one bulkhead 18. The at least one bulkhead 18 divides the interior space 14 of the container 10 into at least two chambers 16, 16' adjacent to each other. In the chambers 16, 16' are received and stored, for example, cryogenic fluids such as oxygen (LOX) and hydrogen (LH2) that are used as fuel/oxidator mixture in an upper stage of a carrier rocket (not shown).

According to FIGS. 2A and 2B, both containers 10 each have only one single bulkhead 18 for dividing the interior space 16 into two separate chambers 16, 16'. Both chambers 16, 16' of the container 10 share the common bulkhead 18.

The embodiments of the container 10 according to the invention shown in FIGS. 2A and 2B only differ in the design of the bulkhead 18 itself respectively the arrangement of the bulkhead 18 within the casing 12 of the container 10. This means that under the embodiment of the container 10 shown in FIG. 2A, the bulkhead 18 is designed in a concave shape. Under the embodiment of the container 10 shown in FIG. 2B, on the other hand, the bulkhead 18 is designed in a convex shape. Apart from that, the two embodiments of the bulkhead 18 of the container 10 according to the invention in accordance with FIGS. 2A and 2B have an identical structural design.

The embodiment of the container 10 according to the invention in accordance with FIG. 1 is formed of at least two container structures 20, 20' or 20', 20" respectively, one of which is shown in FIGS. 3 and 4.

The embodiments of the container 10 according to the invention in accordance with FIGS. 2A and 2B, on the other side, are each formed of at least three container structures 20, 20', 20", one of which is shown in FIGS. 3 and 4.

As can be seen in FIGS. 3 and 4, the container structure(s) 20, 20', 20" is/are each deformed from a blank (not shown) as a single part. The container structure(s) 20, 20', 20" each has/have a dome section 22, a branch section 24 attaching to the dome section 22, and two cylinder sections 26, 28 attaching to the branch section 24.

Without being shown in detail, the adjacent facing container structures 20, 20', or 20', 20" respectively, of the container structures 20, 20', 20" are joined together to form the container 10, the container 10 comprising a chamber 16 according to FIG. 1, or, according to the examples of embodiment shown in FIGS. 2A to 8L, a bulkhead 18 to form two chambers 16, 16'.

Figure 9:
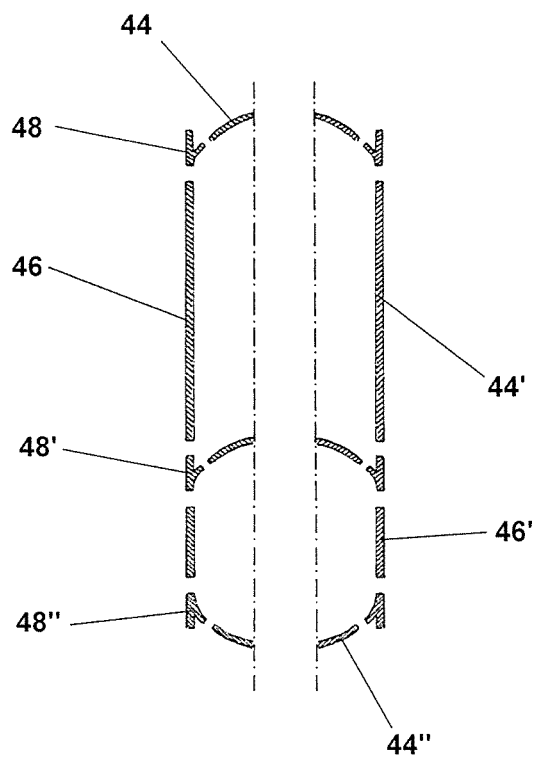

The container structures 20, 20', or 20', 20" respectively, adjacent to each other are joined together directly and/or indirectly via at least one other, additional cylinder element 46, 46' (as already shown in FIG. 9). Here, the container structures 20, 20', or 20', 20" respectively, adjacent to each other and/or the at least one other cylinder element 46, 46' are preferably flow turned and/or spun or welded together.

Furthermore, the container 10, in particular the at least two or three container structures 20, 20', 20" and/or the at least one other cylinder element 46, 46' of the container 10, is/are designed in a lightweight way. Preferably these are made of metal, in particular of steel, stainless steel, aluminium, titanium, an alloy of those and/or a combination of those.

The dome section 22 of the container structure(s) 20, 20', 20" is each designed in a cup shape, in particular in a hemi-spherical, spherical cup, dome, ellipsoid dome, conical, elliptic, Cassini shape or in any other cross-sectional shapes. The cylinder section(s) 26, 28 of the container structure(s) 20, 20', 20" and/or the at least one other cylinder element 46, 46' of the container 10 are reinforced. In a beneficial way, reinforcements 30 are provided in the form of (stiffening) ribs, ribs, reinforcing ribs, stringers and/or isogrid or orthogrid structures.

The production of the embodiments of the container 10 according to the invention shown in FIGS. 1 to 4 is explained in more detail below by example of FIGS. 5A to 5J, alternatively of FIGS. 6A to 6L:

According to FIGS. 5A to 5J, one embodiment of a method according to the invention for producing a container 10 comprises the following steps:

According to FIGS. 5A and 5B a blank 32 is provided. The blank 32 is preferably flat, planar or largely planar or of similar shape. Preferably, the blank 32 is essentially circular or disk-shaped or circular or disk-shaped. In particular, the blank 32 is machined from a planar blank (not shown), for example from a cut piece of sheet metal or similar material by cutting, in particular by mechanical cutting, laser or water jet cutting, sawing, milling or eroding.

Preferably, before that the blank 32 is (pre-)contoured and/or pre-contoured or contoured by machining, in particular by turning, milling and/or grinding. It is also possible, however, to produce the actual blank 32 with a contouring. For example, the blank 32 can also be formed by rolling.

Then the blank 32 is clamped onto or into at least one support structure or spin chuck 34.

Figure 5G:
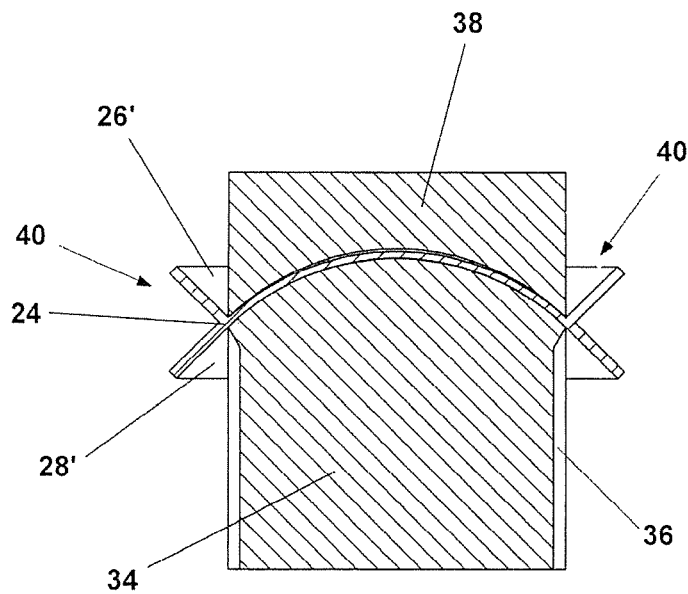

According to FIGS. 5C and 5D, the blank 32 is deformed by spin forming and/or turning using the support structure or spin chuck 34 into a dome section 22 of a container structure 20, 20', 20" or provided with a dome section 22. In the embodiment of the method according to the invention shown in FIGS. 5A to 5J, convex spin forming and/or turning is used.

As can be seen in FIGS. 5C and 5D, the spin chuck 34 has integrated grooves 36 or similar structures to form the reinforcements 30, preferably on the inside, on the container structure(s) 20, 20', 20" at a later stage.

According to FIGS. 5E and 5F, an additional spin chuck 38 is attached after the convex spin forming. Accordingly, the blank 32 and/or the container structure 20, 20', 20" is clamped onto or into the at least one support structure or spin chuck 34 and another support structure or spin chuck 38 acting in conjunction with it. The spin chuck 38 forms a counter support causing a clamping of the container structure 20, 20', 20" or of its previously formed dome section 22.

Figure 5H:
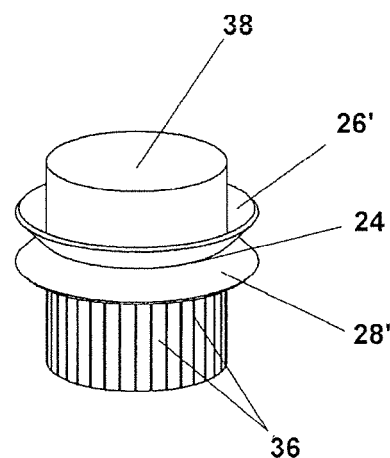

According to FIGS. 5G and 5H, subsequently an edge 40 or the material protruding over the spin chucks 32, 38 at the edge of the blank 32 is deformed into a branch section 24 attaching to the dome section 22 and two essentially radially extending cylinder sections 26', 28' of the container structure 20 that are attaching to the branch section 24 through splitting by means of a splitting roller (not shown) acting on the edge 40 of the blank 32. The splitting roller acting on the edge 40 of the blank 32 has, for example, an essentially cone-shaped, diamond-shaped or sharp-edged cross-section, as the case may be with an additional rounding.

Figure 5I:
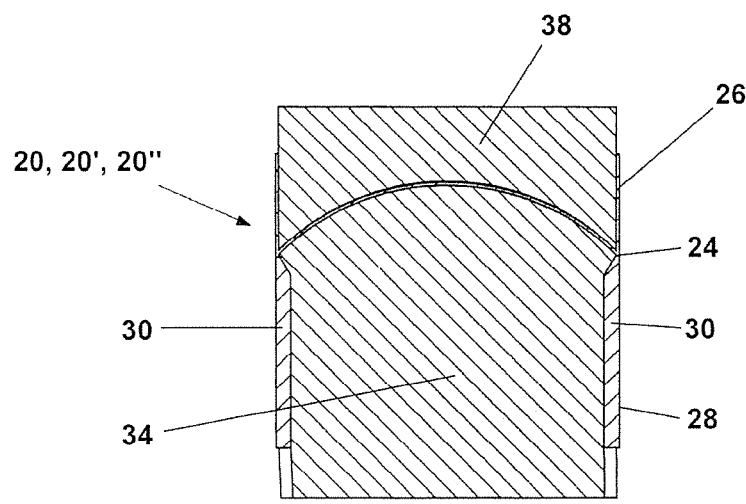
Figure 5J:
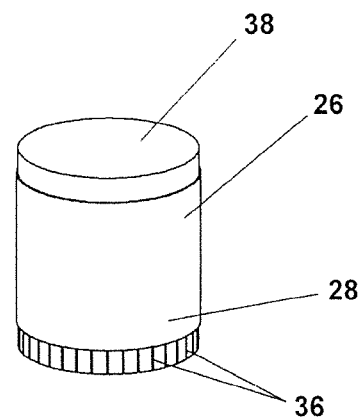

According to FIGS. 5I and 5J, then the two essentially radially extending cylinder sections 26', 28' of the container structure 20 that are attaching to the branch section 24 are flow turned and/or spun into two axially extending cylinder sections 26, 28, that is the upper cylinder section 26 and the lower cylinder section 28, of the container structure 20.

Where the support structure or spin chuck 34 and/or the other support structure or spin chuck 38 has/have corresponding negative contours, at the same time the reinforcements 30, for example in the form of (stiffening) ribs, ribs, reinforcing ribs, stringers and/or isogrid or orthogrid structures, and/or other—also (partially) smooth-walled—structures can be generated in the cylinder section(s) 26, 28, on the outside and/or inside, preferably on the inside, during flow turning or flow pressing and/or spinning.

Finally, the two axially extending cylinder sections 26, 28, that is the upper cylinder section 26 and the lower cylinder section 28, of the container structure 20 can be deformed into their desired length during an additional flow turning or flow pressing and/or spinning and/or stretching process.

Subsequently, at least one or two additional container structure(s) 20', 20" according to steps a) to e) is/are formed.

Thereafter, the adjacent facing container structures 20, 20', or 20', 20" of the container structures 20, 20', 20" respectively, are joined together into a container 10. This can be done by directly joining together the container structures 20, 20', or 20', 20" respectively, adjacent to each other. In an alternative or additional manner, it is also conceivable to indirectly join together the container structures 20, 20', or 20', 20" respectively, adjacent to each other introducing at least one other cylinder element 46, 46' (see FIG. 9).

The joining together of the container structures 20, 20', or 20', 20" respectively, adjacent to each other and/or of the at least one further cylinder element 46, 46' is preferably achieved by flow turning or flow pressing and/or spin welding. A beneficial alternative is also welding, preferably friction stir welding (FSW).

Figure 6A:
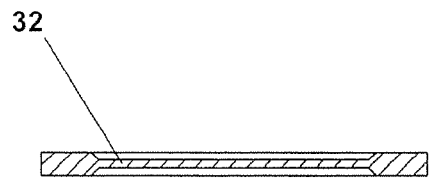
Figure 6B:
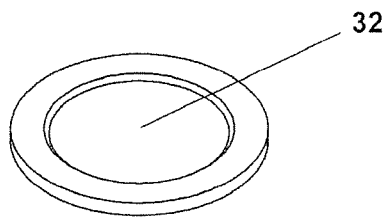

According to FIGS. 6A to 6L, another embodiment of a method according to the invention for producing a container 10 cornprises the following steps:

According to the embodiment shown in FIGS. 6A and 6B, a blank is provided that is designed preferably according to the embodiment in accordance with FIGS. 5A to 5J. Accordingly, the blank 32 is in particular flat, planar or largely planar or of similar shape and/or essentially circular or disk-shaped or circular or disk-shaped. As in the above example of embodiment of FIGS. 5A to 5J, the blank 32 is machined from a planar blank (not shown) that is (pre-) contoured and/or pre-contoured or contoured. However, it is also absolutely conceivable to integrate a contouring into the blank 32.

Figure 6C:
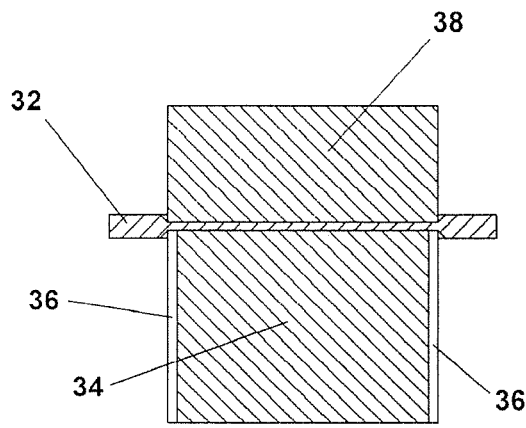
Figure 6D:
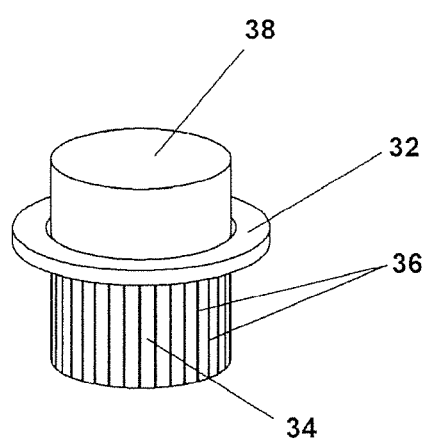

According to FIGS. 6C and 6D, the provided blank 32 is clamped onto or into the at least one support structure or spin chuck 34. Then another support structure or spin chuck 38 is attached. Accordingly, the blank 32 is clamped onto or into the support structure or spin chuck 34 and the other support structure or spin chuck 38 acting in conjunction with it. The spin chuck 38 forms a counter support causing a clamping of the blank 32.

Figure 6E:
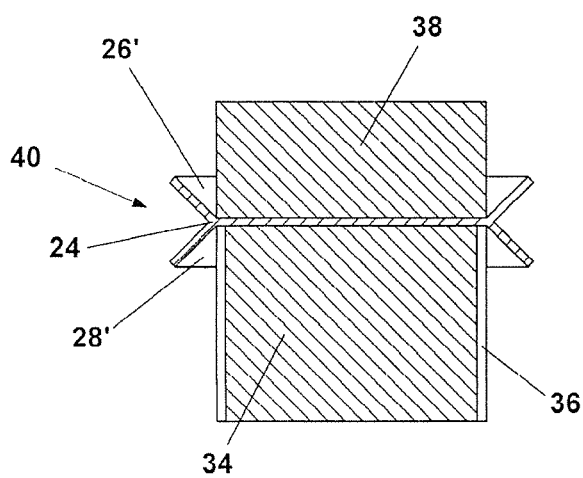
Figure 6F:
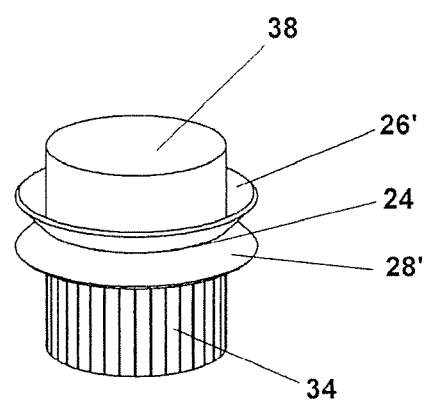

According to FIGS. 6E and 6F, subsequently an edge 40 or the material protruding over the spin chucks 32, 38 at the edge of the blank 32 is deformed into a branch section 24 and two essentially radially extending cylinder sections 26', 28' of a container structure 20 that are attaching to the branch section 24. The deforming is achieved through splitting by means of a splitting roller (not shown) acting on the edge 40 of the blank 32. The splitting roller acting on the edge 40 of the blank 32 has, for example, an essentially cone-shaped, diamond-shaped or sharp-edged cross-section, as the case may be with an additional rounding.

According to FIGS. 6G and 6H, then the two essentially radially extending cylinder sections 26', 28' of the container structure 20 that are attaching to the branch section 24 are flow turned and/or spun into two axially extending cylinder sections 26, 28, that is the upper cylinder section 26 and the lower cylinder section 28, of the container structure 20.

Where the support structure or spin chuck 34 and/or the other support structure or spin chuck 38 has/have corresponding negative contours, now or later the reinforcements 30, for example in the form of (stiffening) ribs, ribs, reinforcing ribs, stringers and/or isogrid or orthogrid structures, and/or other, also (partially) smooth-walled, structures can be generated in the cylinder section(s) 26, 28, on the outside and/or inside, preferably on the inside, during flow turning or flow pressing and/or spinning.

According to FIGS. 6I and 6J, now the blank 32 is deformed by spin forming and/or turning into a dome section 22 of the container structure 20 attaching to the branch section 24. In the embodiment of the method according to the invention shown in FIGS. 6A to 6L, concave spin forming or turning by means of another support structure or spin chuck 42 is provided.

According to FIGS. 6K and 6L, finally the two axially extending cylinder sections 26, 28, that is the upper cylinder section 26 and the lower cylinder section 28, of the container structure 20 can be deformed into their desired length during an additional flow turning or flow pressing and/or spinning and/or stretching process.

As an alternative to the step according to FIGS. 6G and 6H, it is possible during the process to provide the reinforcements 30, for example in the form of (stiffening) ribs, ribs, reinforcing ribs, stringers and/or isogrid or orthogrid structures, and/or other, also (partially) smooth-walled, structures in the cylinder section(s) 26, 28, on the outside and/or inside, preferably on the inside, during flow turning or flow pressing and/or spinning.

Subsequently, at least one or two additional container structure(s) 20', 20" according to steps a) to e) is/are formed.

Thereafter, the adjacent facing container structures 20, 20', or 20', 20" respectively, of the at least three container structures 20, 20', 20" are joined together into a container 10. This can be done by directly joining together the container structures 20, 20', or 20', 20" respectively, adjacent to each other. In an alternative or additional manner, it is also conceivable to indirectly join together the container structures 20, 20', or 20', 20" respectively, adjacent to each other introducing at least one other cylinder element 46, 46' (shown in FIG. 9).

The joining together of the container structures 20, 20', or 20', 20" respectively, adjacent to each other and/or of the at least one other cylinder element 46, 46' is preferably achieved by flow turning or flow pressing and/or spin welding. A beneficial alternative is also welding, in particular friction stir welding (FSW).

Additionally, the production of the embodiments of the container 10 according to the invention shown in FIGS. 1 to 4 is also realized through other methods according to the invention which are shown schematically in FIGS. 7A to 7J and alternatively in FIGS. 8A to 8L.

The embodiment of the method according to the invention in accordance with FIGS. 7A to 7J differs from that shown in FIGS. 5A to 5J in that in step a) instead of a blank 32 that is flat, planar or largely planar or of similar shape, preferably essentially circular or disk-shaped, or circular or disk-shaped, a blank 32' that is cylindrical, in particular in form of a—preferably short—cylinder, is provided.

In particular, the blank 32' is machined from a planar blank (not shown), for example from a cut piece of sheet metal or similar material by cutting, in particular by mechanical cutting, laser or water jet cutting, sawing, milling or eroding, and/or subsequently is preferably (pre-) contoured and/or pre-contoured or contoured by machining, in particular by turning, milling and/or grinding. It is also possible, however, to produce the blank 32' with a contouring. In an alternative embodiment, the blank 32' can be brought into the shape of a cylinder by swaging, forging or rolling.

The same applies without limitation for the embodiment of the method according to the invention that is represented in FIGS. 8A to 8L. This embodiment differs from that shown in FIGS. 6A to 6L in that also in step a) instead of a blank 32 that is flat, planar or largely planar or of similar shape, preferably essentially circular or disk-shaped, or circular or disk-shaped, a blank 32' that is cylindrical, in particular in form of a—preferably short—cylinder, is provided.

The methods according to the invention that are shown in FIGS. 7A to 7J and in FIGS. 8A to 8L have the additional benefit that the cylinder shape and/or the length of the cylinder allow to individually determine the amount of material of the edge 40' which is or should be eventually available depending on the required wall thickness and/or the mutual overlapping area with an adjacent container structure 20, 20', 20" and/or the at least one other cylinder element 46, 46'.

Apart from that, the embodiments of the methods according to the invention shown in FIGS. 5A to 5J and FIGS. 7A to 7J are identical to those shown in FIGS. 6A to 6L and FIGS. 8A to 8L.

The invention is not limited to the illustrated embodiments. Without being shown in detail, the container 10 can also have more than just one chamber 16 or two chambers 16, 16' with a bulkhead 18 separating the two chambers 16, 16'. Therefore, also containers 10 with three and/or more chambers 16, 16' and bulkheads 18 in any respective number are conceivable within the framework of the invention. Without being shown in detail, alternatively it is of course also possible, for example, to provide a splitting of the edge 40, 40' and/or of the material of the blank 32 protruding at the edge already before the convex spin forming and/or turning. Furthermore, it is conceivable that the support structure or spin chuck 34 and/or the other support structure or spin chuck 38 has/have corresponding negative contours to generate the reinforcements 30, for example in the form of (stiffening) ribs, ribs, reinforcing ribs, stringers and/or isogrid or orthogrid structures, and/or other—also (partially) smooth-walled—structures in the cylinder section(s) 26, 28, on the outside and/or inside, preferably on the inside, during flow turning or flow pressing and/or spinning.

The invention claimed is:

1. A method for producing a container for receiving and storing cryogenic fluids with a casing forming an interior space of the container with at least one chamber, or with a casing and at least one bulkhead, two chambers adjacent to each other, said method comprising the following steps:
   a) Providing a blank of flat or planar shape,
   b) clamping the blank onto or into at least one support structure or spin chuck,
   c) deforming a part of the blank by spin forming the part of the blank into a dome section of a container structure,
   d) deforming an edge of the blank into a branch section attached to the dome section and two radially extending cylinder sections of the container structure that are attached to the branch section through splitting by a splitting roller acting on the edge of the blank,
   e) flow turning or flow pressing and/or spinning of the two radially extending cylinder sections of the container structure that are attached to the branch section into two axially extending cylinder sections of the container structure,
   f) forming at least one or two additional container structure(s) according to steps a) to e), thereby resulting in two or more container structures, and
   g) joining the two or more container structures into a container by joining adjacent facing container structures from the two or more container structures.

2. The method according to claim 1, wherein the blank is machined by cutting, wherein said cutting includes mechanical cutting, laser or water jet cutting, sawing, milling or eroding.

3. The method according to claim 1, wherein the blank is (pre-)contoured by machining, wherein said machining includes turning, milling and/or grinding.

4. The method according to claim 1, wherein the blank and/or the container structure is clamped onto or into the at least one support structure or spin chuck and another support structure or spin chuck acting in conjunction with it.

5. The method according to claim 1, wherein the dome section of the container structure is shaped by convex or concave spin forming or turning.

6. The method according to claim 1, wherein the branch section and the two cylinder sections of the container structure are shaped by splitting by a splitting roller acting on the edge of the blank, the splitting roller having cone-shaped, diamond-shaped or sharp-edged cross-section.

7. The method according to claim 1, wherein the two cylinder sections of the container structure that are attached to the branch section are flow turned and/or spun after the splitting by the splitting roller acting on the edge of the blank from the radial extension into two axially extending cylinder sections of the container structure, above and below the dome section and the branch section attached to the dome section.

8. The method according to claim 1, wherein the container structures adjacent to each other are joined together directly and/or indirectly via at least one other cylinder element.

9. The method according to claim 1, wherein the cylinder section(s) of the container structure(s) and/or the at least one other cylinder element of the container are reinforced by reinforcements on the inside, in the form of (reinforcing) ribs, stringers and/or isogrid or orthogrid structures, arranged on the outside and/or inside.

10. The method according to claim 1, wherein the container structures adjacent to each other and/or the at least one other cylinder element are flow turned and/or spun or welded together, by friction stir welding (FSW).

11. The method according to claim 1, wherein the blank to be provided in step a) is circular or disk-shaped.

12. A method for producing a container for receiving and storing cryogenic fluids with a casing forming an interior space of the container with at least one chamber, or with a casing and at least one bulkhead, which separates the interior space of the container into at least two chambers adjacent to each other, said method comprising the following steps:
   a) Providing a blank of flat or planar shape,
   b) clamping the blank onto or into at least one support structure or spin chuck,
   c) deforming an edge of the blank into a branch section and two radially extending cylinder sections of a container structure that are attached to the branch section through splitting by a splitting roller acting on the edge of the blank,
   d) deforming a part of the blank by spin forming the part of the blank into a dome section of the container structure that is attached to the branch section,
   e) flow turning or flow pressing and/or spinning of the two radially extending cylinder sections of the container structure that are attached to the branch section into two axially extending cylinder sections of the container structure according to step c) or d), f) forming at least one or two additional container structure(s) according to steps a) to e), thereby resulting in two or more container structures, and g) joining the two or more container structures into a container by joining adjacent facing container structures from the two or more container structures.

* * * * *